United States Patent [19]

Kanno

[11] Patent Number: 5,784,208
[45] Date of Patent: Jul. 21, 1998

[54] LENS HOOD FOR A LENS BARREL OF AN OPTICAL APPARATUS

[75] Inventor: Hideo Kanno, Chiba, Japan

[73] Assignee: Nikon Corporation, Tokyo, Japan

[21] Appl. No.: 627,508

[22] Filed: Apr. 5, 1996

[30] Foreign Application Priority Data

Apr. 5, 1995 [JP] Japan ............................ 7-080327

[51] Int. Cl.⁶ .......................... G02B 15/14; G03B 11/04
[52] U.S. Cl. .................................... 359/704; 396/534
[58] Field of Search ............................ 362/202, 208; 359/503, 504, 704, 694; 396/534, 535

[56] References Cited

U.S. PATENT DOCUMENTS 5,267,131  11/1993  Anthony et al. ..................... 362/208

Primary Examiner—Georgia Y. Epps
Assistant Examiner—Ricky Mack

[57] ABSTRACT

A lens hood which is mountable on a lens barrel of a camera or other optical apparatus. Plural projections are provided on a generally tubular surface of the lens hood and project in radial directions with respect to the optical axis of the camera. The plural projections are formed at the side of lens hood which mounts on the lens barrel, thereby stabilizing the lens barrel and the lens hood when placed on a flat surface and facilitating the mounting of the lens hood on the lens barrel.

3 Claims, 5 Drawing Sheets

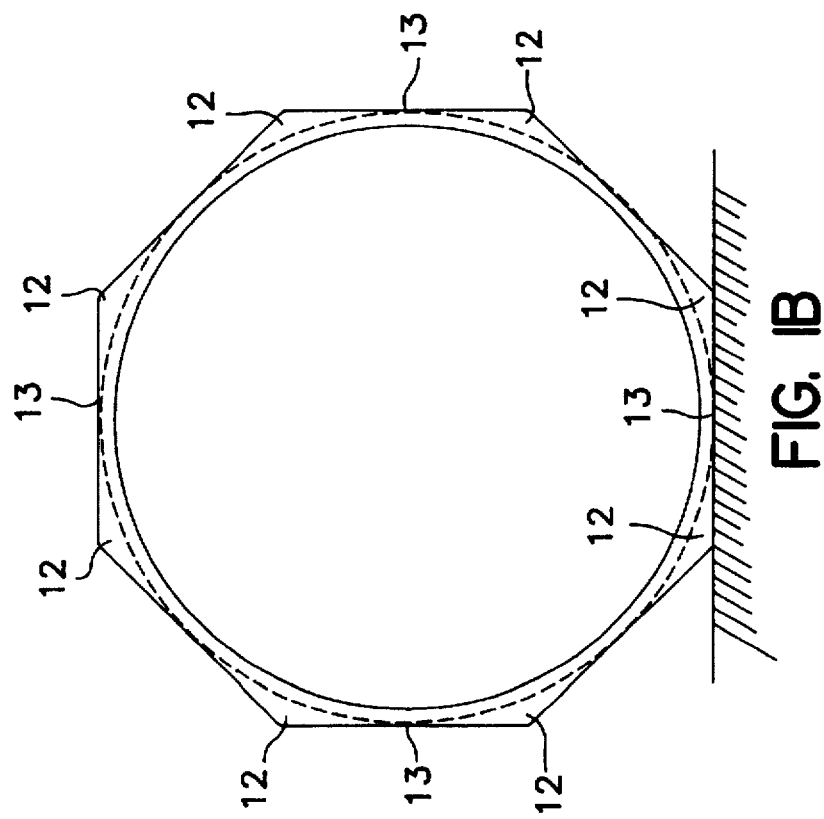
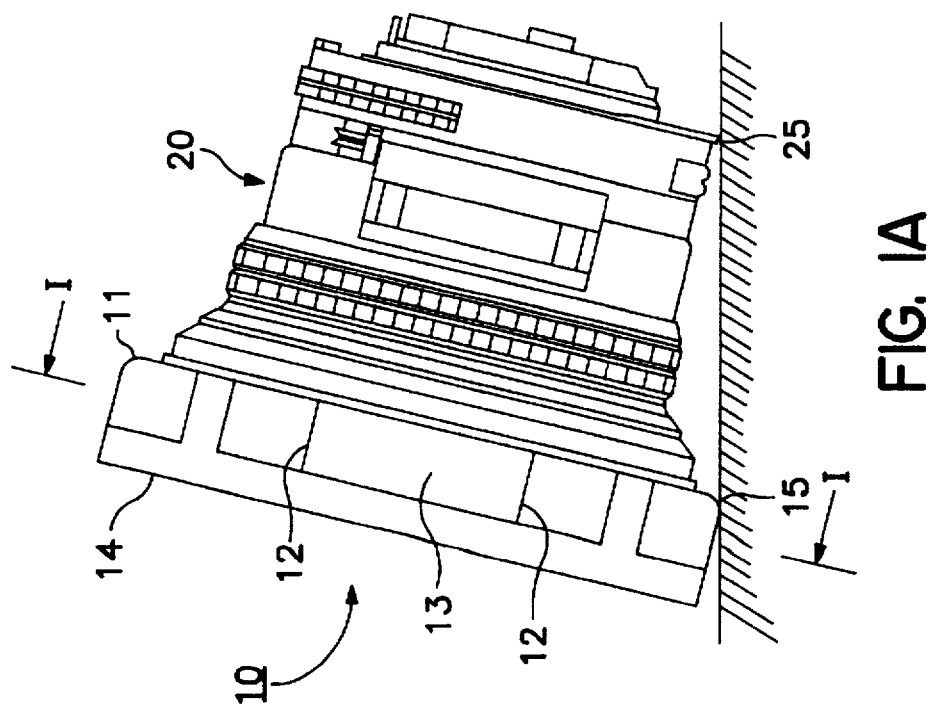
FIG. 1A
FIG. 1B

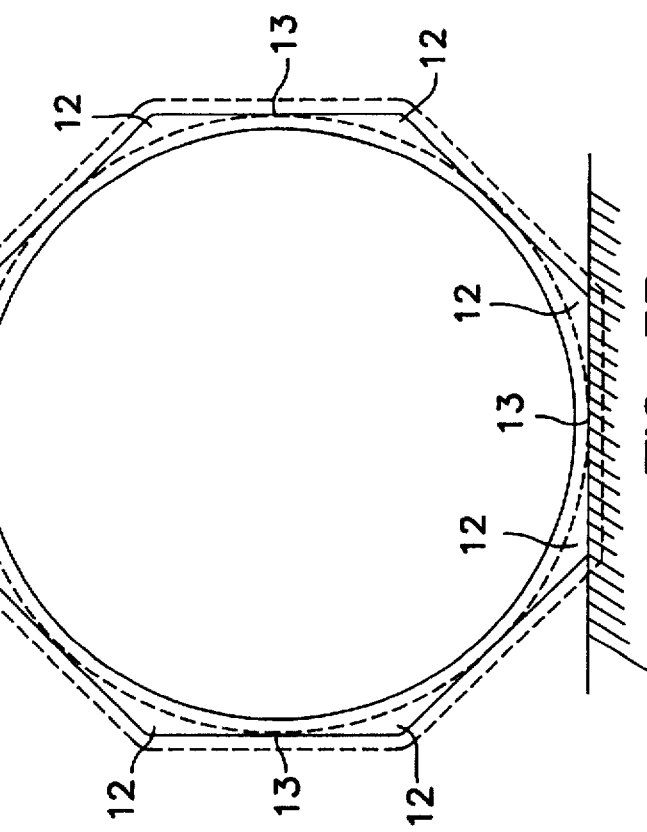
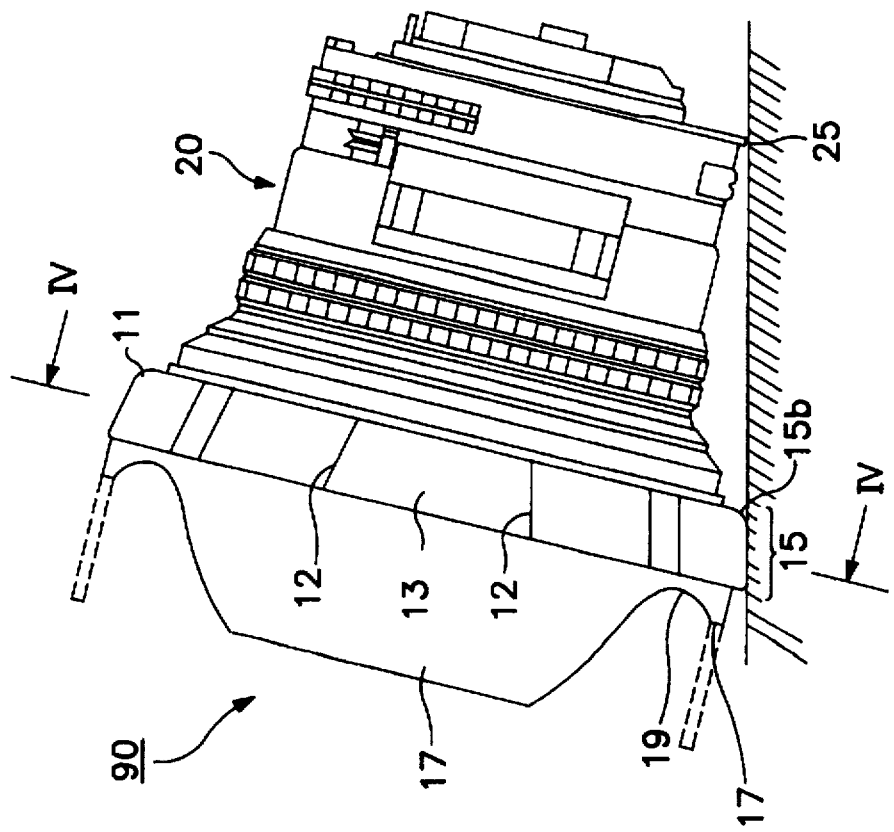

LENS HOOD FOR A LENS BARREL OF AN OPTICAL APPARATUS

BACKGROUND OF THE INVENTION

1. Field of the Invention

The present invention relates to a lens barrel apparatus, and more particularly, to a lens hood which is used for installation on the front end of a lens barrel of an optical apparatus, such as a camera.

2. Description of the Related Art

Lens hoods are known which are mounted on the front end of a lens barrel during use of an optical apparatus, and more particularly, when performing photography with a camera. The object of these lens hoods is to screen superfluous light coming from outside the field angle of the lens barrel. There are various types of mountings, but among these various types, a bayonet mounting has been adopted for a large number of lens hoods in recent years, because mounting to the lens barrel is quickly and easily performed. Additionally, in the case of lenses having a particularly wide field angle, such as a wide angle lens or the wide angle side of a zoom lens, to increase the effect of the lens hood, a deep notch portion is arranged in the front end of the lens hood, and the lens hood bears a shape which resembles tulip petals.

However, a problem with the conventional lens hoods is that they are made in a smooth tubular shape, and in the case of attaching to or detaching from the lens barrel by a bayonet method, a hand of a user slips on the tubular surface, and the operation of the same is difficult. Moreover, because the lens barrel has a tubular form, the lens hood also has been made in a tubular form. The problem with this configuration is that if it is placed on a table, the lens hood easily rolls off. Furthermore, in a lens hood with deep notches disposed at the front end, the problem is that the fingers holding the lens barrel easily become caught in the notches, and the photographed image surface frequently ends up eclipsed. This problem is particularly marked in an ultra wide lens with notch portions which are deep.

SUMMARY OF THE INVENTION

Accordingly, it is an object of the present invention to provide a lens hood, which is easily mountable to a lens barrel of an optical apparatus, particularly a camera, and which solves the aforementioned problems.

It is a further object of the present invention to provide a lens hood having notch portions, such that when the notch portions become blocked, eclipsing of the photographic picture plane of the optical apparatus (camera) is prevented.

Additional objects and advantages of the invention will be set forth in part in the description which follows and, in part, will be obvious from the description, or may be learned by practice of the invention.

The foregoing objects of the present invention are achieved by providing a lens hood mountable on a lens barrel, the lens hood including a cylindrical body having a front side opposite from the lens barrel and a rear side adjacent to the lens barrel, when the lens hood is mounted on the lens barrel, and projecting portions formed in radial directions from an optical axis of the lens barrel and at the rear side of cylindrical body.

The foregoing objects are also achieved by a lens hood mountable on a lens barrel of an optical apparatus, the lens hood including a cylindrical body having a front side opposite from the lens barrel and a rear side adjacent to the lens barrel, when the lens hood is mounted on the lens barrel, and projecting portions formed in radial directions from an optical axis of the optical apparatus and at the rear side of cylindrical body, wherein projecting portions extend further in the radial directions from the optical axis than the outer surface of the lens barrel.

In the case of attaching the lens hood to or detaching the lens hood from the lens barrel while rotating the lens hood on the lens barrel, it is possible for a user to perform the attaching and detaching operations by applying the user's fingers to the projecting portions.

In the case of placing the lens hood on top of a table, it is possible to place two adjacent projections on the lens hood so that they provide support. As a result, when a rotation moment is applied to the lens hood, the supporting projections prevent the rotation of the lens hood.

Further, the hand or finger of the user holding the lens barrel, in the case of displacement in the direction of the front end portion of the lens hood, touches the projecting portions earlier than reaching the notch portions of the lens hood.

Also, the two adjacent projections may be placed flat so as to support the lens hood, thereby enlarging the supporting area of the projections.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 1A is a schematic drawing showing a lens hood according to a first embodiment of the present invention.

FIG. 1B is a cross-sectional view of the lens hood according to the first embodiment of the present invention as seen from line I—I in FIG. 1A.

FIG. 5A is a schematic drawing showing a lens hood according to a fifth embodiment of the present invention.

FIG. 5B is a cross-sectional view of the lens hood according to the fifth embodiment of the present invention as seen from line IV—IV in FIG. 5A.

DESCRIPTION OF THE PREFERRED EMBODIMENTS

Figure 2:
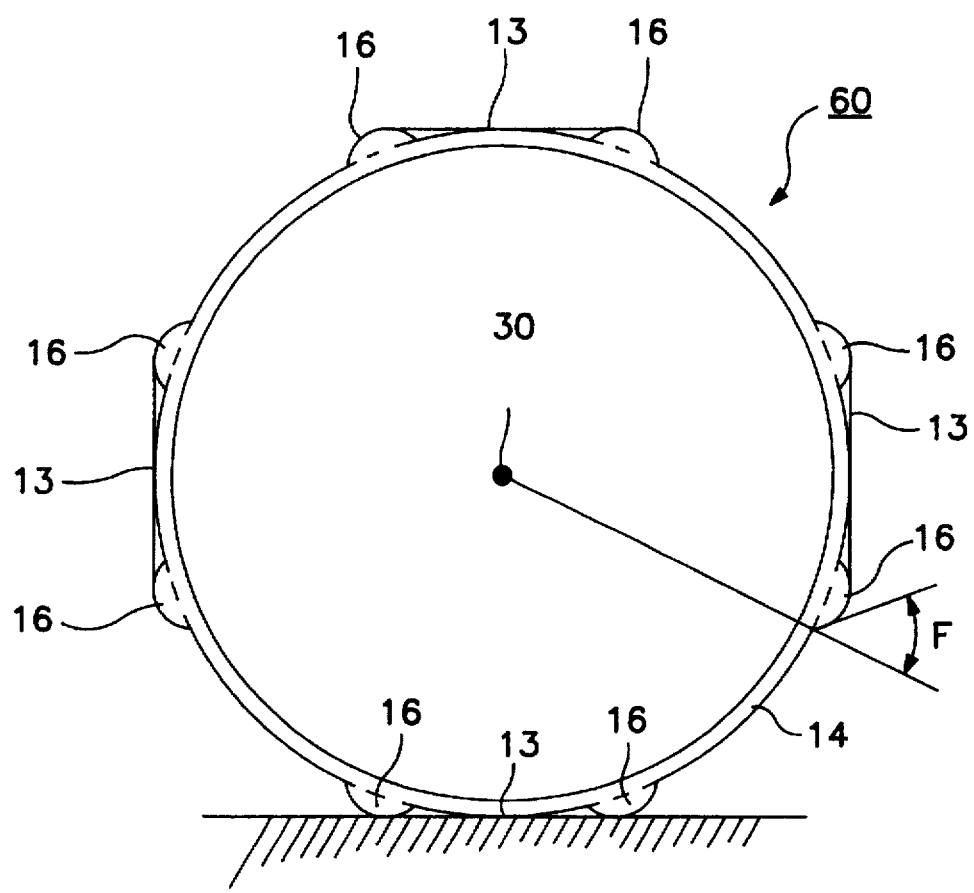
FIG. 2 is a cross-sectional view of a lens hood according to a second embodiment of the present invention.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

FIGS. 1A and 1B are drawings showing a lens barrel apparatus having a lens hood and a lens barrel suitable for a camera or other optical apparatus according to a first embodiment of the present invention. In FIG. 1A, a lens hood 10 is shown in a mounted state on a lens barrel 20, and is a side view when a flange is placed on top. FIG. 1B is a diagram along line I—I of FIG. 1A.

The lens hood 10 has a generally circular shape, with a diameter larger than the diameter of the lens barrel 20. The outer circumferential surface 14 of the lens hood 10 has a predetermined width W from the rim 11 of its rear end portion to the front side, and a predetermined height H from the outer circumferential surface 14. A total of eight projecting portions 12 project in the radial direction with respect to the optical axis of the lens hood 10, thus giving the lens hood an octagonal cross-section along line I—I. Here, the predetermined width W, in the case that the lens hood 10 is held in the hand, means the width to which the fingers of the user can be stably applied between the projecting portions. Moreover, the predetermined height H means the height of a straight line joining the respective top portions of one projecting portion and another projecting portion positioned closest to this projecting portion (termed below as a pair of projecting portions), from a center of the lens hood 10.

Four flat portions 13 are flat surfaces joining the respective top portions of a pair of projecting portions 12. In the case that the lens hood 10 is mounted on the lens barrel 20, they are arranged in positions corresponding to the top and bottom, and right and left directions of the lens barrel 20 as shown in FIG. 1B.

Moreover, the rear end of the lens hood 10 has about the same diameter as the diameter of the lens barrel 20, and has the capability of being joined to the lens barrel 20 by a bayonet method.

In the case of attachment to or detachment from the lens barrel 20, the lens hood 10 is held by fingers of a user such that the fingers are applied to the projecting portions 12. By rotating the lens hood 10 relative to the lens barrel 20, the lens hood 10 attaches to or detaches from the lens barrel 20. At this time, because the projecting portions 12 confer the effect of preventing slippage of the fingers, it is possible to easily perform the attachment or detachment operations.

If the lens hood 10, when mounted to lens barrel 20, is placed on the flat surface of a table, etc., as shown in FIG. 1A, a supporting portion 15 of the lens hood 10 and a supporting portion 25 of lens barrel 20 contact a table to support the lens hood 10 and the lens barrel 20 on the table. Here, the supporting portion 25 is a rim of the rear end portion of the lens barrel 20, and the supporting portion 15 is formed by the respective rear ends of a pair of projecting portions 12 and the rear end of a flat portion 13 therebetween. In other words, the supporting portion is formed by one of the edges of one side of the octagonal shape of the lens hood 10 along the line I—I. As a result, even in the case that a rotational moment is applied due to whatever origin, the projecting portions 12 press against the table, and because a rotational moment is generated which resists this rotational moment, the lens hood 10 and lens barrel 20 maintain a dynamically stable state. Thus, the lens hood 10 and lens barrel 20 are prevented from moving and rolling on the table top.

Moreover, in the sites exterior of the flat portions 13, even when the lens hood 10 is supported, by the lens hood slightly rotating, because a projecting portion 12 adjacent to the supporting position contacts the table, the lens hood 10 does not continue to rotate on the table top.

FIG. 2 is a diagram showing a cross-sectional view of a lens hood 60 according to a second embodiment of the present invention. Elements which perform functions similar to those of the lens hood of the first embodiment are given the same reference symbols and duplicate descriptions are appropriately omitted.

The lens hood 60 of the second embodiment differs from the lens hood 10 of the first embodiment in that the form of projecting portions 16 are approximately semicircular. When the projecting portions 16 having such a cross-sectional shape are used, because the angle F of intersection of the outer circumferential surface 14 with the outer circumferential surface of each projecting portion 16 is smaller than in the first embodiment, the fingers of the user have a better grasp of the projecting portions 16. Accordingly, the effect of preventing slippage of the fingers of a user on the projecting portions of the lens hood is further increased.

Figure 3B:
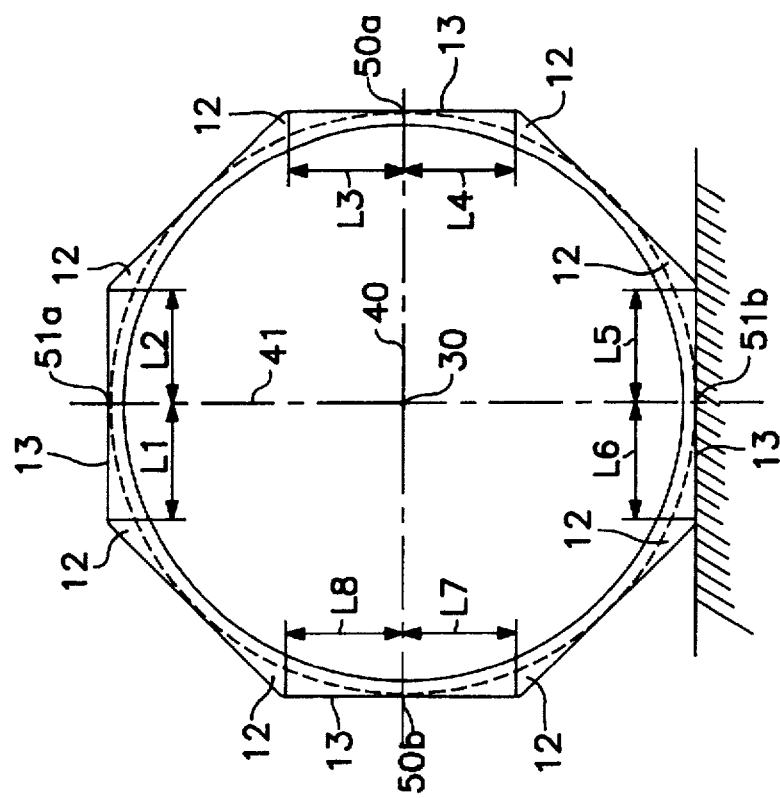
FIG. 3B is a cross-sectional view of the lens hood according to the third embodiment of the present invention as seen from line II—II in FIG. 3A.
Figure 3A:
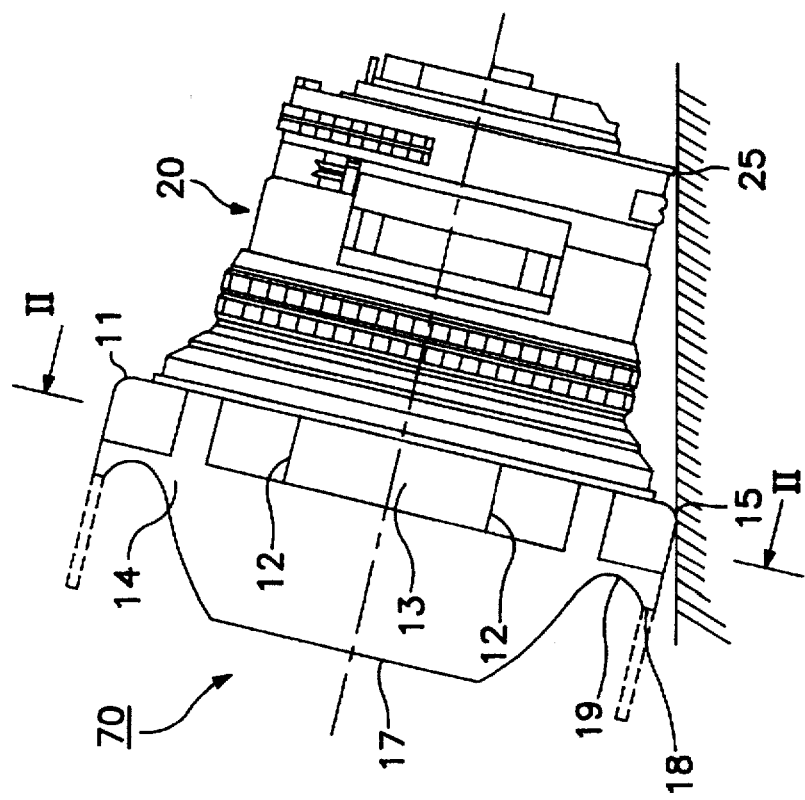
FIG. 3A is a schematic drawing showing a lens hood according to a third embodiment of the present invention.

FIGS. 3A and 3B are diagrams showing a lens barrel apparatus having a lens hood according to a third embodiment of the present invention. FIG. 3A is a drawing showing a side view of a lens hood 70 which has been placed, in the mounted state on a lens barrel 20, on a table top; FIG. 3B is a cross-sectional view of the lens hood 70 along line II—II of FIG. 3A.

The lens hood 70 of the third embodiment differs from the lens hood 10 of the first embodiment in that it has notch portions 19 between flange portions 17 and flange portions 18.

The flange portions 17 are two flanges to screen off excess light incident on the lens barrel from the top and bottom directions with respect to a photographic picture plane (not shown). Two flanges respective centers 51a and 51b of the circular circumferential direction, mounted on the left-hand side and right-hand side of the front edge portion of the lens hood 10, overlap the chain line 41. The chain line 41 is an imaginary line dividing the photographic picture plane into right and left sides and passing through an optical axis 30.

Eight projecting portions 12 are positioned on the outer circumferential surface 14 to form an octagonal shape, such that the distances ($L_1$–$L_8$) from each projecting portion to the closest center among the centers 50a, 50b, 51a and 51b are equal. The centers of the four flat portions 13, positioned on the outer circumferential surface 14, have respective centers in the circumferential direction which coincide with the respective centers 50a, 50b, 51a or 51b.

In the case of performing photography with the lens hood 70 of the third embodiment mounted on the lens barrel 20, the photographer performs photography while supporting the lens barrel with one hand. At the time of photography, the hand (fingers) supporting the lens barrel, moves to the front end portion of the lens hood, or the hand (finger) may strike the projecting portion 12, and is prevented from displacement forward of this position. Moreover, the photographer perceives from the tactile sensation that the hand (finger) is incorrectly positioned. In this manner, the photographer's hand (fingers), not being inadvertently applied to the notch portions 19, are prevented from eclipsing the photographed picture.

Figure 4B:
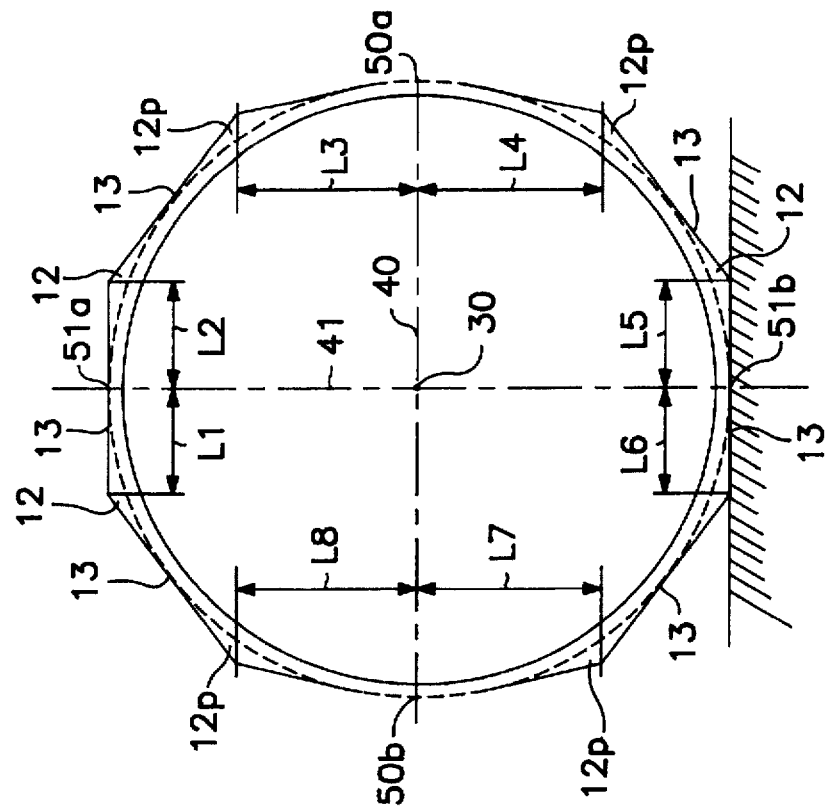
FIG. 4B is a cross-sectional view of the lens hood according to the fourth embodiment of the present invention as seen from line III—III in FIG. 4A.
Figure 4A:
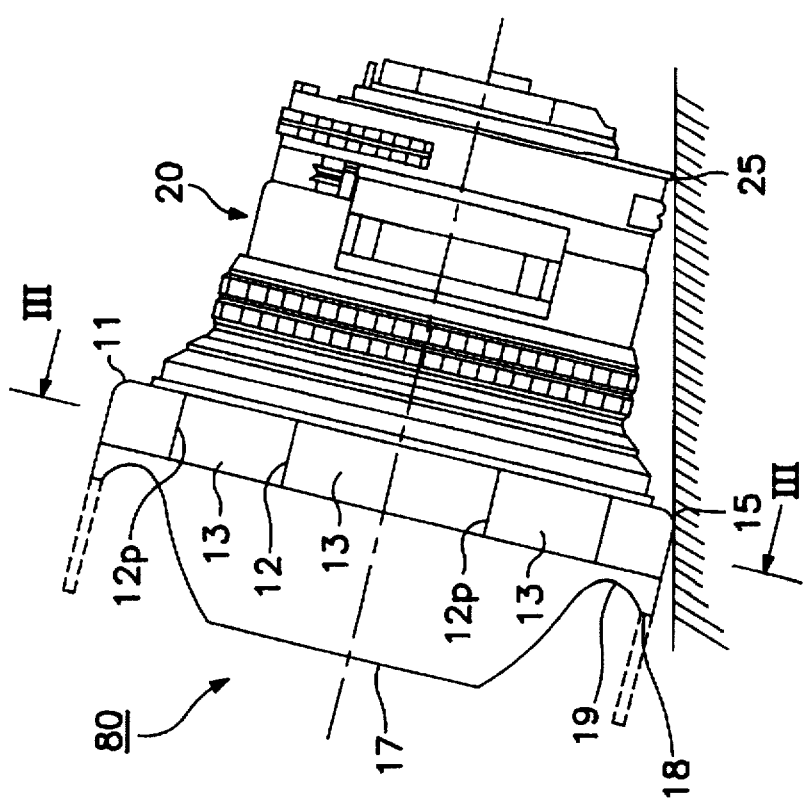
FIG. 4A is a schematic drawing showing a lens hood according to a fourth embodiment of the present invention.

FIGS. 4A and 4B are drawings showing a lens barrel apparatus having a lens hood according to a fourth embodiment of the present invention. FIG. 4A is a side view of a lens hood 80 which has been placed, in the mounted state on a lens barrel 20, on a table top; FIG. 4B is a cross-sectional view along line III—III of FIG. 4A.

The lens hood 80 of the fourth embodiment differs from the lens hood 70 of the third embodiment in that the distances $L_3$, $L_4$, $L_7$ and $L_8$ are longer than the distances $L_1$, $L_2$, $L_5$ and $L_6$; and in that four projections 12p are located in the rear sides of the notch portions 19. The cross-sectional shape of the lens hood 80 is substantially decagonal.

In this manner, by locating the projections 12p closest to the notch portions 19, it becomes possible to more reliably prevent the photographer's hand (fingers), which supports the lens hood, from being applied to the notches 19.

FIGS. 5A and 5B are drawings showing a lens barrel apparatus having a lens hood according to a fifth embodiment of the present invention. FIG. 5A is a side view of a lens hood 90 which has been placed, in a mounted state on a lens barrel 20, on a table top; FIG. 5B is a cross-sectional view along line IV—IV of FIG. 5A.

In the lens hood 90 of the fifth embodiment, a supporting pair of projections 12 are disposed on a plane which includes three points: the rear ends 15b of the respective supporting portions, and a supporting portion 25 of the lens barrel. In other words, the lens hood 90 and the lens barrel 70 are supported by the plane portion 23. In this manner, in the case that the lens hood 90 is placed on top of a table, the whole of the top portion of a projection 12 contacts the table. Therefore, each plane portion 13 is arranged so as to join the top portions of a pair of adjacent projecting portions 12, such that the whole surface of the plane portion 13 contacts with the table. As a result, the lens hood 90 of the fifth embodiment, in comparison with the lens hoods of the above-mentioned four embodiments, is more stably placed on the flat surface of a table, etc.

The lens hood for the lens barrel apparatus of the present invention is not limited to the five embodiments which have been described hereinabove. Various alterations and modifications are possible, without departing from the scope of the invention.

In the above-mentioned embodiments, the method of connecting the lens hood to the lens barrel has been described as using a bayonet method, but may also be other connecting means, for example a screw connection.

Moreover, in the above-mentioned embodiments, descriptions have been given regarding cases in which the outer circumferential surface also has flat surfaces other than the projecting portions, and it is possible to obtain the same effects.

As in the detailed descriptions given hereinabove, because a lens hood has projection portions on its outer circumferential surface, in the case of rotary attachment or detachment in a lens barrel, the projecting portions allow for the user to have a better grasp of the lens hood, and the attaching or detaching operation becomes easy.

Further, rotary movement of the lens hood can be prevented, because it is possible to place two adjoining projecting portions of the lens hood so as to be supported, even when the lens hood is placed on a flat surface.

Because the projecting portions of the lens hood prevent the user's hand (fingers), which supports the lens barrel, from reaching as far as the notch portions of the lens hood, taking a photograph in a state with a finger accidentally being applied to the notch portions is prevented.

In the case that the lens hood is placed on a flat surface such that two adjoining projecting portions support the lens hood, because the supporting area of the projecting portions is large, the stability of the lens hood is increased.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A lens hood mountable on a lens barrel, the lens hood comprising:

a cylindrical body having a front side opposite from the lens barrel and a rear side adjacent to the lens barrel, when the lens hood is mounted on the lens barrel; and projecting portions formed in radial directions from an optical axis of the lens barrel and at the rear side of said cylindrical body;

wherein the front side of said cylindrical body includes flange portions and notch portions between the flange portions, and ones of said projecting portions are arranged in vicinities of respective bottoms of said notch portions.

2. A lens hood mountable on a lens barrel, the lens hood comprising:

a cylindrical body having a front side opposite from the lens barrel and a rear side adjacent to the lens barrel, when the lens hood is mounted on the lens barrel; and projecting portions formed in radial directions from an optical axis of the lens barrel and at the rear side of said cylindrical body;

wherein said projecting portions form planar surfaces between adjacent ones of said projecting portions, and wherein the front side of said cylindrical body includes flange portions and notch portions between the flange portions, and ones of said projecting portions are arranged in vicinities of respective bottoms of said notch portions.

3. A lens hood mountable on a lens barrel of an optical apparatus, the lens hood comprising:

a cylindrical body having a front side opposite from the lens barrel and a rear side adjacent to the lens barrel, when the lens hood is mounted on the lens barrel; and projecting portions formed in radial directions from an optical axis of the optical apparatus and at the rear side of said cylindrical body, wherein said projecting portions extend further in the radial directions from the optical axis than the outer surface of the lens barrel;

wherein said projecting portions form planar surfaces between adjacent ones of said projecting portions; and wherein the front side of said cylindrical body includes flange portions and notch portions between the flange portions, and ones of said projecting portions are arranged in vicinities of respective bottoms of said notch portions.

* * * * *